United States Patent
Halbweiss et al.

(10) Patent No.: US 6,557,923 B2
(45) Date of Patent: May 6, 2003

(54) ROOF STORAGE COMPARTMENT COVER FOR A CONVERTIBLE VEHICLE

(75) Inventors: Thomas Halbweiss, Remseck (DE); Alexander Bernhardt, Pforzheim (DE); Andreas Hasselgruber, Eberdingen-Nussdorf (DE)

(73) Assignee: LTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/096,353

(22) Filed: Mar. 12, 2002

(65) Prior Publication Data

US 2002/0130532 A1 Sep. 19, 2002

(30) Foreign Application Priority Data

Mar. 13, 2001 (DE) .......................................... 101 12 344

(51) Int. Cl.⁷ ................................................... B60J 7/20
(52) U.S. Cl. ..................... 296/136; 296/107.08; 74/625
(58) Field of Search ......................... 296/107.08, 136; 74/625

(56) References Cited

U.S. PATENT DOCUMENTS

| 5,758,923 | A | * | 6/1998 | Kolb ...................... 296/107.09 |
| 5,823,606 | A | * | 10/1998 | Schenk et al. ......... 296/107.08 |
| 6,149,221 | A | * | 11/2000 | Mentink ...................... 296/117 |
| 6,250,707 | B1 | * | 6/2001 | Dintner et al. ................. 296/76 |
| 6,497,447 | B1 | * | 12/2002 | Willard ........................ 296/108 |
| 2002/0011739 | A1 | * | 1/2002 | Nicastri .................... 296/107.08 |
| 2002/0093218 | A1 | * | 7/2002 | Weissmueller et al. ..... 296/136 |
| 2002/0130532 | A1 | * | 9/2002 | Halbweiss et al. .......... 296/136 |

FOREIGN PATENT DOCUMENTS

| DE | 44 45 944 C1 | 4/1996 |
| DE | 196 35 869 C1 | 1/1998 |
| DE | 198 01 853 C1 | 8/1999 |
| DE | 198 13 290 A1 | 8/1999 |
| DE | 199 12 893 A1 | 9/2000 |
| EP | 0 933 242 A1 | 8/1999 |

* cited by examiner

Primary Examiner—D. Glenn Dayoan
Assistant Examiner—Paul Chenevert
(74) Attorney, Agent, or Firm—Klaus J. Bach

(57) ABSTRACT

In a roof storage compartment cover operating arrangement for a convertible vehicle whose roof is movable between a closed position and a storage position in a storage compartment, a hydraulic operating mechanism for operating the roof storage compartment cover and a force element for applying to the roof storage compartment cover a force in the opening direction are connected to opposite ends of a rocker whose pivoting angle is limited so that the roof storage compartment is opened to a greater degree when operated by the hydraulic operating mechanism than it is when manually opened while the hydraulic operating mechanism is inoperative.

8 Claims, 4 Drawing Sheets

ROOF STORAGE COMPARTMENT COVER FOR A CONVERTIBLE VEHICLE

BACKGROUND OF THE INVENTION

The invention relates to a roof storage compartment cover for a convertible vehicle whose roof is movable between a closed position and a storage position in the storage compartment, which can be closed by the cover under the control of a hydraulic operating member.

The German patent publication DE 196 35 869 C1 discloses a roof storage compartment lid which covers a rear storage compartment of a convertible vehicle in which the vehicle roof can be deposited when the vehicle is to be operated topless. For opening the vehicle's roof, the storage compartment lid, which is pivotally supported on the vehicle body, is pivoted open by means of a hydraulic operating mechanism whereupon the components of the vehicle roof are transferred to the rear storage compartment. Then the storage compartment lid is again closed. The opening movement and the closing movement of the storage compartment lid are executed automatically by control of the hydraulic operating mechanism depending on the actual position of the vehicle roof. An active involvement of the vehicle driver is not necessary for opening and closing the storage compartment lid.

If the hydraulic operating mechanism fails, the storage compartment lid must be opened manually which may require substantial efforts. Particularly, near the fully open position of the storage compartment lid, the force requirements may further increase since, in this position, the lid may be close to its dead center position.

DE 44 45 944 C1 discloses a trunk lid which covers a storage compartment for a removable vehicle roof and which can be opened and closed by a controllable hydraulic operating mechanism. The hydraulic operating mechanism is connected to an auxiliary frame of the lid and pivots it about a transverse pivot axis for opening the lid. By means of the hydraulic operating mechanism, an automatic opening and closing of the lid can be initiated.

As an additional support component, a gas spring is provided which is also connected to the auxiliary frame and applies thereto a force in the opening direction of the lid. In order to obtain a large passage for the transfer of the vehicle roof into, and out of, the storage compartment, the hydraulic operating mechanism, as well as the gas spring, are moved to their fully extended positions. The purpose of the gas spring is to support the lid—in addition to the operating mechanism—but at another location. The engagement points of the hydraulic operating member and the gas spring with the auxiliary frame are spaced apart. For the opening of the lid upon failure of the hydraulic operating mechanism a relatively large manual force is needed. In this case, the gas spring is of no help.

It is the object of the present invention to provide a roof storage compartment cover for a convertible vehicle, which can easily be opened manually upon failure of the hydraulic operating mechanism. The maximum opening angle of the compartment cover should expediently be limited upon failure of the hydraulic operating mechanism.

SUMMARY OF THE INVENTION

In a roof storage compartment cover operating arrangement for a convertible vehicle, whose roof is movable between a closed position and a storage position in a storage compartment, a hydraulic operating mechanism for operating the roof storage compartment cover and a force element for applying to the roof storage compartment cover a force in the opening direction are connected to opposite ends of a rocker, whose pivoting angle is limited so that the roof storage compartment is opened to a greater degree when operated by the hydraulic operating mechanism than it is when manually opened while the hydraulic operating mechanism is inoperative.

The force element provided in addition to the hydraulic operating element, by which the roof storage compartment can be automatically opened, applies to the roof storage compartment cover a force in the direction toward its open position and therefore supports the movement of the cover to its open position. The force required for opening the cover is therefore reduced so that the manual opening of the cover is facilitated. In addition, the load on the hydraulic operating mechanism is reduced, since also during a normal opening movement of the cover the force element and the hydraulic operating mechanism cooperate.

Furthermore, a rocker is pivotally supported on the roof storage compartment cover and the hydraulic operating mechanism and the force element are connected to opposite ends thereof. With the design of the rocker and/or stops limiting the rocker movement, the maximum opening angle of the storage compartment cover during actuation by the hydraulic operating mechanism and during manual opening of the cover can be different. It is particularly possible to provide for a smaller opening angle limit for the cover during manual opening than during opening by the hydraulic operating mechanism so that operation in the area of the dead center position of the cover with respect to the force element can be avoided during manual opening.

The operating movements of the cover in different directions are achieved by the different response of the rocker during hydraulic actuation and during manual operation.

Preferably, the rocker movement, which is provided by the force element during a failure of the hydraulic operating mechanism, is limited by a stop in order to provide for a smaller maximum opening angle during manual opening than during opening of the cover by the hydraulic operating mechanism.

The stop may be provided directly at the roof storage compartment cover so that the rocker engages this stop upon manual opening of the cover. In addition, or alternately, a stop may be provided at the force element so that it engages the force element in order to limit the movement of the force element. With the stop or stops, the maximum opening movement of the cover can be adjusted depending on the pivot direction of the rocker.

The force element includes preferably an extendable telescopic arm whose outward movement can be limited by the stop.

The cover is preferable provided with another stop at the side of the rocker to which the hydraulic operating mechanism is connected.

It may be expedient to provide an additional rocker spring, which biases the rocker in the same pivot direction as does the force element, which preferably includes a telescopic arm. In this way, the manual opening movement is supported upon failure of the hydraulic operating mechanism.

The point of the attachment of the hydraulic operating mechanism to the rocker is preferably closer to the pivot axis of the roof-storage compartment cover than the connection point of the force element with the rocker so that a comparatively smaller travel of the hydraulic operating mechanism is required for achieving maximum opening of the roof storage compartment cover.

The invention and its advantages will become more readily apparent from the following description of preferred embodiments on the basis of the accompanying drawings.

DESCRIPTION OF A PREFERRED EMBODIMENT

Figure 1:
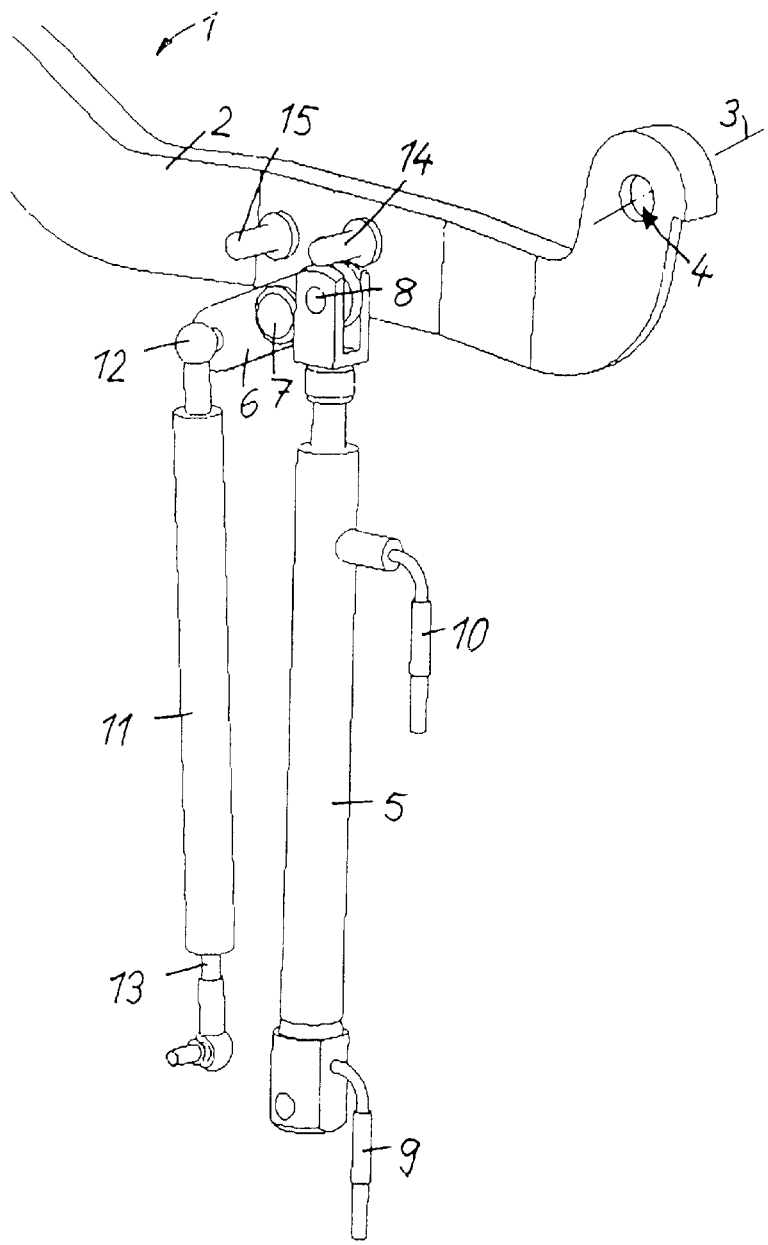
FIG. 1 shows in a partial view a roof storage compartment cover which covers the storage space for a convertible vehicle roof, including a cover operating mechanism comprising a hydraulic operating member and a gas spring in a closed position of the cover.
Figure 1A:
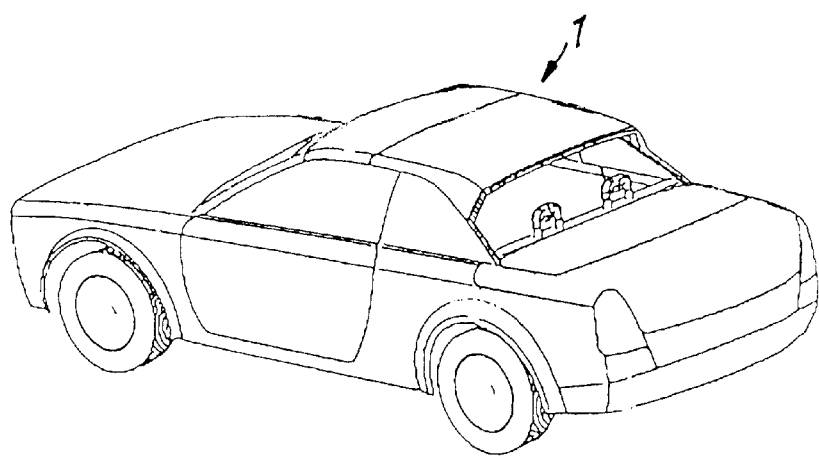
FIG. 1A shows a convertible vehicle including a convertible roof, a roof storage compartment, and roof storage compartment cover.
Figure 2:
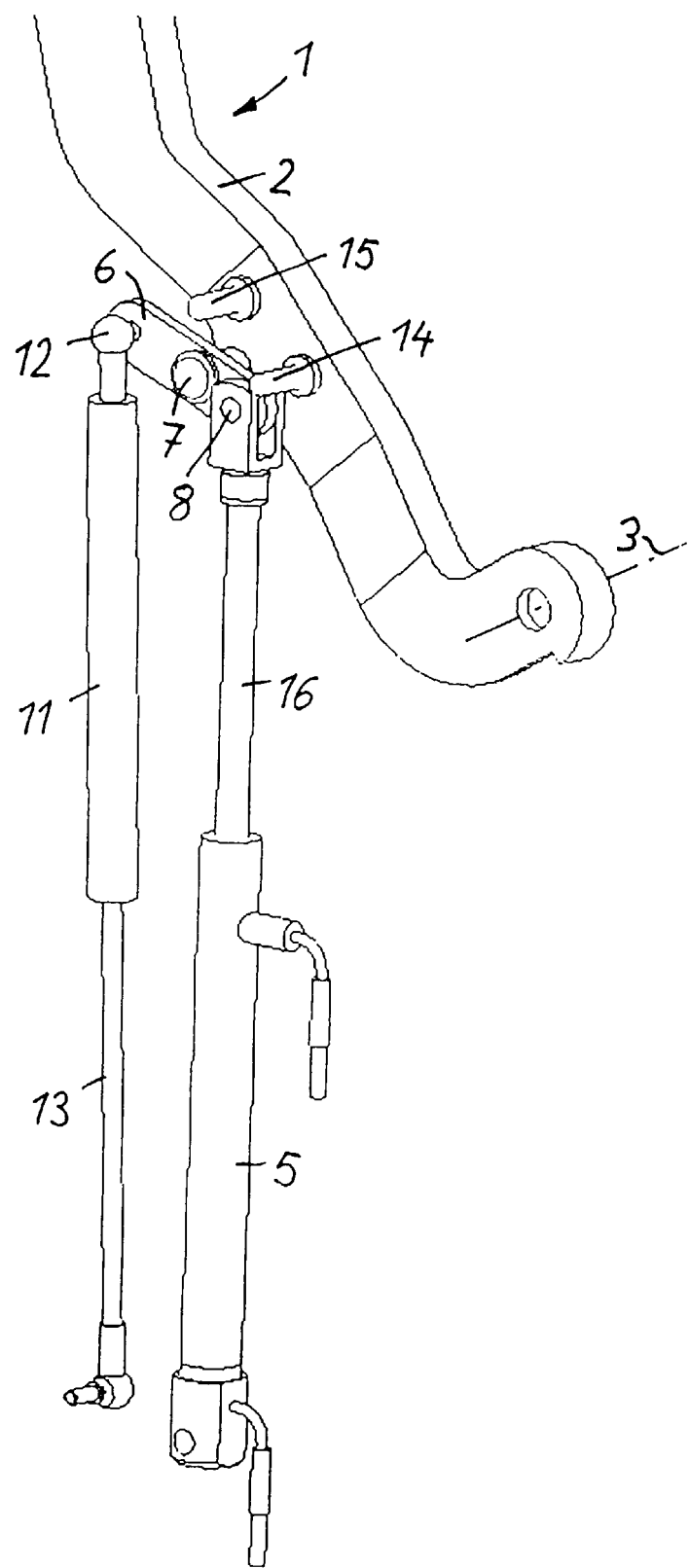
FIG. 2 shows the arrangement of FIG. 1 in a fully open position of the roof storage compartment cover supported by the hydraulic operating mechanism.

In the following description, identical components shown in the various figures are designated by the same reference numeral. As shown in FIG. 1, a roof storage compartment cover 1, of which only a pivot arm 2 is shown, is connected to a vehicle body by way of a joint 4 so that it is rotatably supported about a pivot axis 3. The roof storage compartment cover 1 is for example in the form of a trunk lid, which also covers a storage compartment for accommodating a convertible vehicle roof when the roof is opened. The roof storage compartment cover 1 is pivotably movable by a hydraulic operating mechanism 5 from the closed position as shown in FIG. 1 to the open position as shown in FIG. 2. The hydraulic operating mechanism 5 is supported on the vehicle body and is connected, by way of a joint 8, to one end of a rocker 6, which is pivotally connected to the roof storage compartment cover 1 by way of a pivot joint 7. The joint 8 forms a force application point for the hydraulic operating mechanism 5 to the rocker 6. Hydraulic fluid is supplied to, and released from, the hydraulic operating mechanism 5 by fluid supply and return lines 9 and 10. The hydraulic operating mechanism 5 is actuated expediently by control from a control unit depending on the actual movement of the vehicle roof during the transfer between the closed and the storage positions.

In addition, there is a force element 11, which is arranged essentially in parallel with the operating mechanism 5 and which, in the given example, is a gas spring. The force element 11 is pivotally connected to the other end of the rocker 6 by way of a joint 12. The force transmission point for the force element 12 to the rocker 6 is therefore opposite the joint 8 of the hydraulic operating mechanism with regard to the pivot joint 7 of the rocker 6. At its end remote from the rocker 6, the force element 11 is supported also on the vehicle body. The force element 11 comprises an extendable telescopic arm 13 in order to be able to be elongated corresponding to the hydraulic operating mechanism when the roof storage compartment cover is opened. The force element 11 biases the roof storage compartment cover 1 in the opening direction.

Normally, when the hydraulic operating mechanism is operative, the rocker 6 is pivoted by the hydraulic operating mechanism at the beginning of the opening procedure counter-clockwise as shown in the figures. To this end, the joint 8 of the hydraulic operating mechanism 5 is moved together with the right rocker lever upwardly into engagement with the stop 14 which is firmly mounted to the pivot arm 2 of the roof storage compartment cover 1. Another stop 15 is disposed, firmly mounted to the pivot arm 2 above the rocker 6 at the opposite end of the rocker 6 that is above the force element 11.

FIG. 2 shows the arrangement when the roof storage compartment cover 1 has reached the maximum opening position which can be achieved by activation of the hydraulic operating mechanism 5. The hydraulic operating mechanism 5 with its telescopic rod 16 is then fully extended. The rocker 6 engages the stop 14 of the pivot arm 2 at the end of the rocker 6 adjacent the hydraulic operating mechanism. Since the force element 11 is biased to an extended position, the telescopic arm 13 of the force element 11 is also fully extended. In the position as shown in FIG. 2, wherein the telescopic arm 13 of the force element 11 is fully extended, the telescopic arm movement is preferably limited by an internal stop in the force element 11. In this way, an over-extension of the force element 11 and engagement of the end of the rocker, to which the force element is connected, with the stop 15 is safely prevented when the hydraulic operating mechanism is operative.

Figure 3:
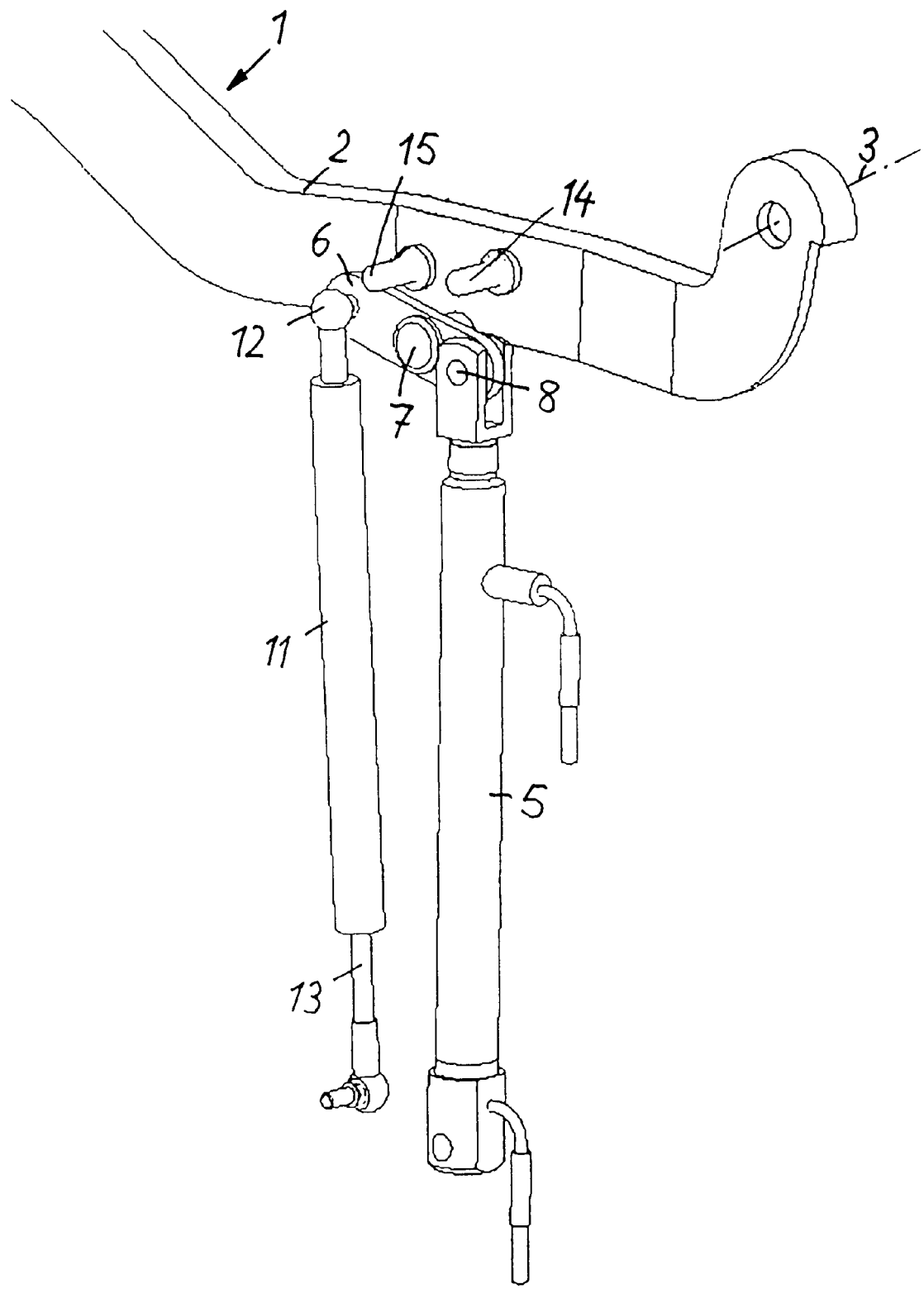
FIG. 3 shows the roof storage compartment cover in a closed position wherein the hydraulic operating mechanism is inoperative and the cover is biased into the opening direction only by the gas spring.
Figure 4:
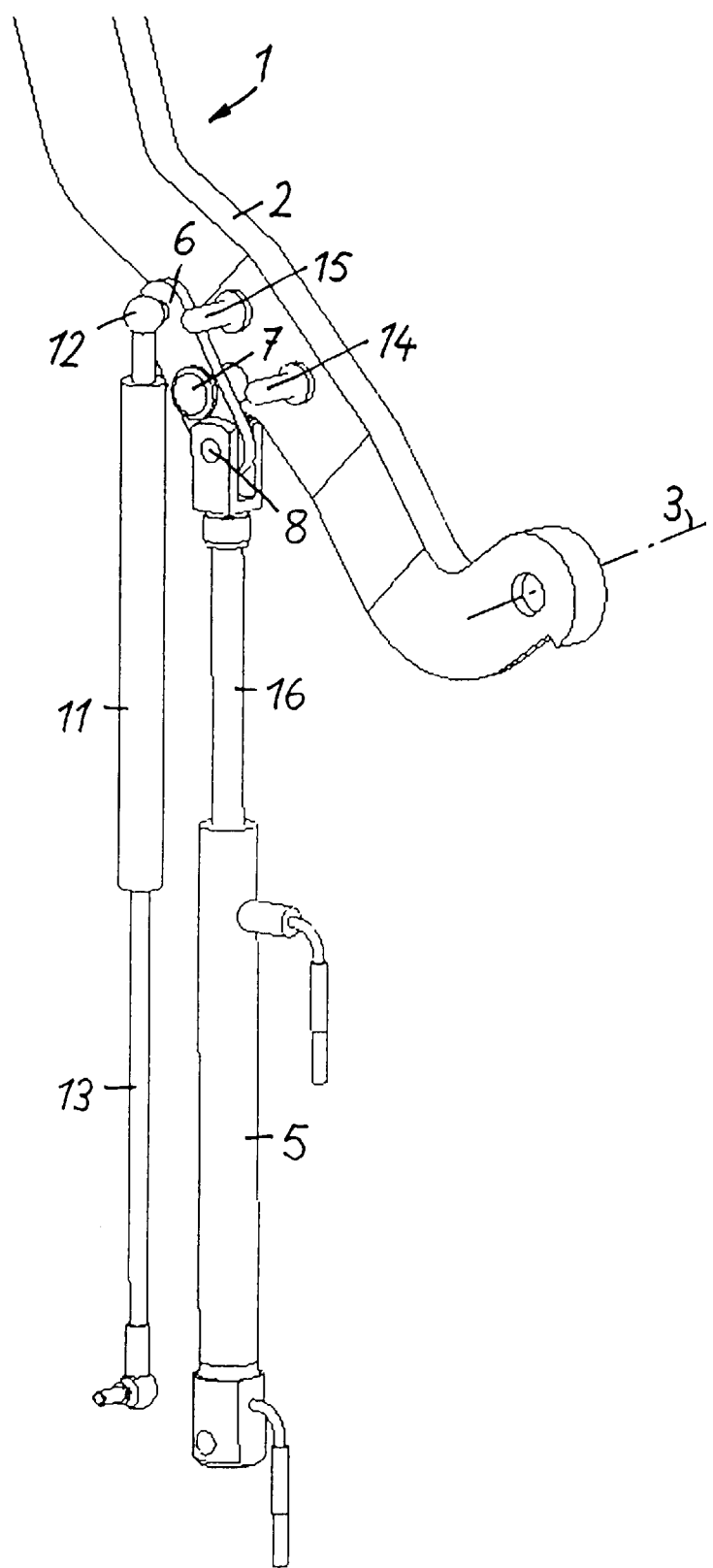
FIG. 4 shows the roof storage compartment cover in an open position with the hydraulic operating mechanism inoperative.

FIGS. 3 and 4 show the arrangement under conditions where the hydraulic operating mechanism 5 is inoperative so that, upon manual opening of the roof storage compartment cover 1, the telescopic arm 16 of the hydraulic operating mechanism 5 is extended without power.

As apparent from FIG. 3, at the beginning of such an opening movement of the roof storage compartment cover 1, the rocker 6 is moved, by the force stored in the force element 11 into engagement with the stop 15 of the pivot arm 2, which stop 15 is disposed above the force element 11. Since the hydraulic operating mechanism is inoperative, the telescopic arm 16 of the hydraulic operating mechanism remains in the inserted position until it is pulled out of this position by the rocker 6.

FIG. 4 shows the roof storage compartment cover in the fully open position achievable without the actuation of the hydraulic operating mechanism 5. This opening position is different from that shown in FIG. 2, which is achieved by actuation of the hydraulic operating mechanism, wherein the rocker 6 is pivoted to the opposite end position into abutment with the stop 14. The maximum cover opening which can be achieved without actuation of the hydraulic operating mechanism but with the aid of the force element 11 is smaller than that achievable with the actuation of the hydraulic operating mechanism 5. The different degree of opening is achieved by the pivoting of the rocker 6 in opposite directions wherein for each pivot direction a different limit is provided. As shown in FIG. 4, the maximum opening angle of the roof storage compartment cover 1 is limited by the maximum extension of the force element 11 and is provided by the rising of the stop 15 on the rocker 6. During opening of the roof storage compartment cover 1 also the telescopic rod 16 of the hydraulic operating mechanism 5 is extended, but it provides no opening force because the system is inoperative. The rocker 6 therefore does not engage the stop 14 at the side adjacent the hydraulic operating mechanism 5.

The rocker arm 6 may be biased by a spring about its pivot joint 7 in a pivot direction such that it normally engages the stop 15.

What is claimed is:

1. A roof storage compartment cover for a convertible vehicle having a roof movable between a closed position and a storage position in a storage compartment, said storage compartment cover being supported so as to be pivotable about a cover pivot axis between a closed position, in which it covers said roof storage compartment, and an open position permitting introduction of said roof into said storage compartment by an operating structure comprising a hydraulic operating mechanism for lifting and lowering said roof storage compartment cover, a force element for applying to said roof storage compartment cover a force in its opening direction and a rocker supported on said roof storage compartment cover pivotally about a rocker pivot axis and having arms extending from said rocker pivot axis in opposite directions, said hydraulic operating mechanism being connected to one of said arms and said force element being connected to the other of said arms.

2. A roof storage compartment cover according to claim 1, wherein said force element comprises a telescopic structure including a telescopic rod and a stop is provided for limiting outward movement of said telescopic rod.

3. A roof storage compartment cover according to claim 2, wherein said stop is arranged on said roof storage compartment cover so as to limit pivot movement of the rocker arm to which said force element is connected.

4. A roof storage compartment cover according to claim 3, wherein another stop is mounted on said roof storage compartment cover above the arm of said rocker to which said hydraulic operating mechanism is connected for limiting the pivot movement of said rocker caused by actuation of said hydraulic operating mechanism.

5. A roof storage compartment cover according to claim 4, wherein said stops are arranged on said roof storage compartment cover so as to permit limited pivoting of said rocker whereby the roof storage compartment cover is opened to greater extent when operated by said hydraulic operating mechanism than when the hydraulic operating mechanism is inoperative and the cover is manually opened.

6. A roof storage compartment cover according to claim 2, wherein said rocker is biased into engagement with said stop which is disposed adjacent said force element.

7. A roof storage compartment cover according to claim 1, wherein said hydraulic operating mechanism is connected to the end of said rocker which is closer to the pivot axis of said roof storage compartment cover.

8. A roof storage compartment cover according to claim 1, wherein said force element is a gas spring.

* * * * *